Patented Feb. 6, 1951

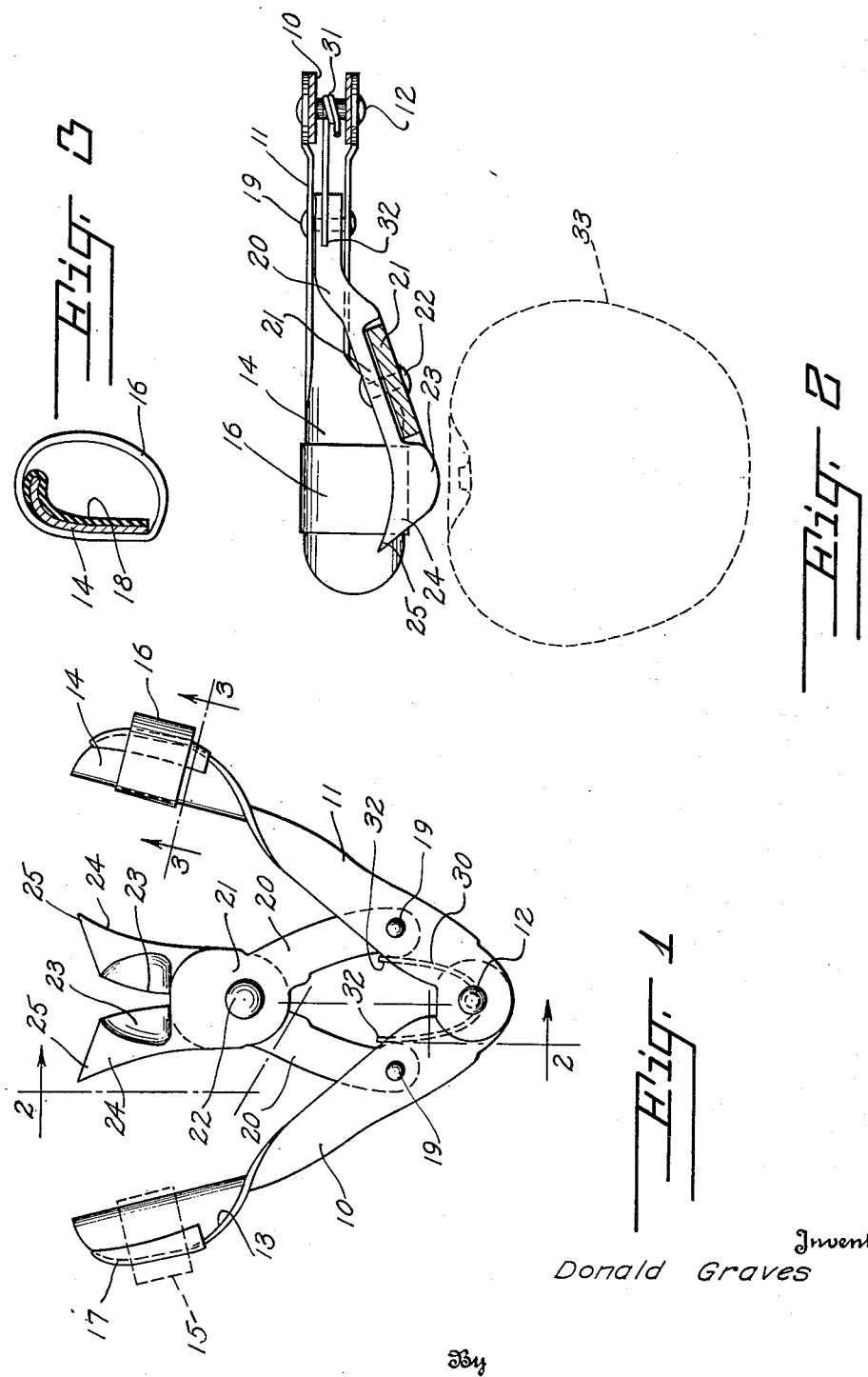

2,540,255

UNITED STATES PATENT OFFICE 2,540,255

FRUIT CLIPPER

Donald Graves, San Bernardino, Calif.

Application May 9, 1947, Serial No. 746,996

2 Claims. (Cl. 30—193)

This invention relates to a fruit clipper, and more particularly to such a device adapted for the picking of citrus fruit, such as oranges, lemons, and the like.

A primary object of this invention is the provision of an improved hand clipper for fruit of this character adapted to cut the stems thereof, the arrangement being such that the clipper may be operated by two fingers of one hand, the remaining fingers being utilized to grasp the fruit.

A further object of the invention is the provision of a device of this character provided with means for securely attaching the same to the thumb and forefinger, which are adapted to operate the device, leaving the remaining fingers and the palm of the hand for grasping the fruit.

An additional object of the invention is the provision of improved clipper blades characterized by guiding wings, adapted to direct the stem of the fruit between the clipper blades, in such manner that the cut is effected substantially at the surface of the fruit.

Still other objects reside in the combinations of elements, arrangements of parts, and features of construction, all as will be more fully pointed out hereinafter and disclosed in the accompanying drawings, wherein there is shown a preferred embodiment of this inventive concept.

In the drawings:

Figure 1 is a top plan view of one form of device embodying features of the instant inventive concept, certain concealed portions thereof being indicated in dotted lines.

Figure 2 is a sectional view taken substantially along the line 2—2 of Figure 1, as viewed in the direction indicated by the arrows, the relative position of the device in association with the citrus or other fruit being indicated, the fruit being shown in dotted lines.

Figure 3 is a sectional view taken substantially along the line 3—3 of Figure 1, as viewed in the direction indicated by the arrows.

Similar reference characters refer to similar parts throughout the several views of the drawings.

The clippers of the instant invention comprise a pair of handle members 10 and 11, each of substantially channel shape, and overlapped at their juncture, connected in pivotal relation, as by a pivot pin or rivet 12. The extremities of each handle member are reversely twisted to form interiorly arcuate finger grips 13 and 14, respectively. Each finger grip is adapted to be surrounded by a resilient band 15 and 16, respectively, as well as provided with an interior resilient cushion 17 and 18, respectively. The arrangement is such that the device may be used either by the right hand or left hand, one of the finger grips being engaged by the forefinger of the operating hand, and the other by the thumb. The handle members are adapted to overlie the top of the hand, leaving the hand free, and, when compressed by the thumb and forefinger, will serve, in a manner to be more fully described hereinafter, to sever the fruit, the free fingers of the hand being used being adapted to grasp the fruit.

Pivotally connected, as by pivots 19, to each handle member 10 and 11 at a point relatively closely adjacent the pivot 12, but spaced therefrom, are a pair of blade members 20, each including an enlarged portion 21 on each angularly offset with respect to the general plane of the handle members and pivotally secured together, as by a pivot 22. Beyond the pivot 22, each portion 21 is cut away at an opposite side and sharpened to form a blade surface 23. Guide wings 24 are provided adjacent each blade surface, and project upwardly terminating in points 25, the points 25 being adapted to engage and guide the stem of a fruit to be cut inwardly between the blades.

Spring means are provided for normally biasing the blades to open position, and take the form of a wire spring 30 coiled, as at 31, about pivot pin 12, and having its extremities 32 extending outwardly into abutting relation with the inner sides of the extremities of the blade members 20, the effect of the spring being normally to bias the handle portions 10 and 11 outwardly, and hence separate the blade cutting surfaces 23.

From the foregoing it will now be seen that when the device is grasped between the thumb and forefinger, as previously described, the fruit indicated in dotted lines at 33, may be grasped by the free fingers against the palm of the hand, the points 25 utilized to guide the stem of the fruit between the cutting blades 23, and by compression of the finger grip members 13 and 14, the blades closed to sever the stem. The arcuate configuration of the blades, depending, as best shown in Figure 2, will serve effectively to sever the stem relatively close to the fruit.

Thus, there is herein provided a device which accomplishes all the objects of this invention, and others, including many advantages of great practical utility and commercial importance, including the rapid, expeditious, and simple severing of the stems of citrus fruits to facilitate picking the same.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A fruit clipping device comprising a pair of handle members arranged in face to face relation and pivotally connected together at one of their ends for movement toward and away from each other, a pair of blade members arranged in face to face relation and pivotally connected intermediate their ends for movement toward and away from each other positioned within said handle members, one of said blade members having one end pivotally connected to one of said handle members adjacent to and spaced from the pivotal connection of said one end of said handle members, the other of said blade members having one end pivotally connected to the other of said handle members adjacent to and spaced from the pivotal connection of said one end of said handle members, the other ends of said blade members being provided with opposed blade surfaces for the reception therebetween of a fruit stem to be severed, and a spring coiled about the pivotal connection of said one end of said handle members and having its ends in abutting engagement with said one end of said blade members for biasing said blade members away from each other, the portion of each of said blade members remote from said one end thereof being offset with respect to said handle members.

2. A fruit clipping device comprising a pair of handle members arranged in face to face relation and pivotally connected together at one of their ends for movement toward and away from each other, a pair of blade members arranged in face to face relation and pivotally connected intermediate their ends for movement toward and away from each other positioned within said handle members, one of said blade members having one end pivotally connected to one of said handle members adjacent to and spaced from the pivotal connection of said one end of said handle members, the other of said blade members having one end pivotally connected to the other of said handle members adjacent to and spaced from the pivotal connection of said one end of said handle members, the other ends of said blade members being provided with opposed blade surfaces for the reception therebetween of a fruit stem to be severed, a spring coiled about the pivotal connection of said one end of said handle members and having its ends in abutting engagement with said one end of said blade members for biasing said blade members away from each other, the portion of each of said blade members remote from said one end thereof being offset with respect to said handle members, and a resilient band carried by each of the other ends of said handle members for the accommodation therein of a user's finger.

DONALD GRAVES.

REFERENCES CITED

The following references are of record in the file of this patent:

UNITED STATES PATENTS

| Number | Name | Date |
|---|---|---|
| 1,145,082 | Porter | July 6, 1915 |
| 1,163,733 | Bernard | Dec. 14, 1915 |
| 1,357,200 | Kiefer | Oct. 26, 1920 |
| 1,775,562 | Kerns | Sept. 9, 1930 |

FOREIGN PATENTS

| Number | Country | Date |
|---|---|---|
| 790,261 | France | Sept. 2, 1935 |